(12) United States Patent
Fahrion et al.

(10) Patent No.: US 9,636,751 B2
(45) Date of Patent: May 2, 2017

(54) TOOL HOLDER

(71) Applicant: Eugen Fahrion GmbH & Co KG, Kaisersbach (DE)

(72) Inventors: Ulrich Fahrion, Kaisersbach (DE); Markus Geiger, Gaildorf (DE); Salvatore Cavallaro, Schorndorf (DE)

(73) Assignee: Eugen Fahrion GmbH & Co. KG, Kaisersbach (DE)

( * ) Notice: Subject to any disclaimer, the term of this patent is extended or adjusted under 35 U.S.C. 154(b) by 231 days.

(21) Appl. No.: 14/497,389

(22) Filed: Sep. 26, 2014

(65) Prior Publication Data

US 2015/0091259 A1  Apr. 2, 2015

(30) Foreign Application Priority Data

Oct. 2, 2013 (EP) .................................. 13187054
Feb. 6, 2014 (EP) .................................. 14154112

(51) Int. Cl.
*B23B 31/107* (2006.01)
*B23B 31/20* (2006.01)
*B23B 31/02* (2006.01)

(52) U.S. Cl.
CPC .......... *B23B 31/1078* (2013.01); *B23B 31/02* (2013.01); *B23B 31/202* (2013.01); *B23B 2231/2005* (2013.01); *B23B 2231/2024* (2013.01); *B23B 2231/2035* (2013.01); *B23B 2231/2048* (2013.01); *B23B 2231/46* (2013.01); *B23B 2231/48* (2013.01);

(Continued)

(58) Field of Classification Search
CPC .............. B23B 31/1078; B23B 31/202; B23B 2231/2005; B23B 2231/2024; B23B 2231/2048; B23B 2231/2035; Y10T 279/17367; Y10T 279/17461; Y10T 279/17358; Y10T 279/17452; Y10T 279/17761; Y10T 279/20

See application file for complete search history.

(56) References Cited

U.S. PATENT DOCUMENTS 2,270,661 A  1/1942 Montgomery
2,337,400 A * 12/1943 Maute .................. B23B 31/202
                                                    279/53

(Continued)

FOREIGN PATENT DOCUMENTS

CH  676683 A5  2/1991
DE  676380 C  *  6/1939  .......... B23B 31/005

(Continued)

*Primary Examiner* — Eric A Gates
(74) *Attorney, Agent, or Firm* — Leydig, Voit & Mayer, Ltd.

(57) ABSTRACT

A tool holder includes a collet configured to be clamped to the shank of a tool and a pull-out protection element configured to secure the tool against being pulled out of the collet. The pull-out protection further includes a protection element such that pull-out forces acting on the tool are transmitted to the collet. The protection element is mounted so as to be moveable relative to the collet and has a wedge-shaped configuration as well as force-transmission surface. When the protection element is in a radially inner engaged position with the tool, the protection element is configured to be clamped to the cool and the collet so as to be self locking.

20 Claims, 7 Drawing Sheets

(52) U.S. Cl.
CPC ... *B23B 2265/32* (2013.01); *Y10T 279/17358* (2015.01); *Y10T 279/17367* (2015.01); *Y10T 279/17452* (2015.01); *Y10T 279/17461* (2015.01); *Y10T 279/17761* (2015.01)

(56) References Cited

U.S. PATENT DOCUMENTS

| | | | |
|---|---|---|---|
| 3,136,561 A | | 6/1964 | McAuliffe et al. |
| 3,618,962 A | | 11/1971 | Cox et al. |
| 4,197,044 A | * | 4/1980 | Cummings ......... B23B 31/1074 279/52 |
| 4,266,895 A | * | 5/1981 | Lewis ................. B23B 31/1074 279/52 |
| 4,330,923 A | * | 5/1982 | Cummings ......... B23B 31/1074 29/434 |
| 4,341,006 A | * | 7/1982 | Staron ................ B23B 31/1074 279/56 |
| 4,377,292 A | | 3/1983 | Staron |
| 4,437,801 A | * | 3/1984 | Lewis ................. B23B 31/1074 279/52 |
| 5,152,541 A | | 10/1992 | Baumgaertner et al. |
| 5,234,296 A | | 8/1993 | Presby et al. |
| 5,460,388 A | * | 10/1995 | Lewis .................. B23B 31/001 279/42 |
| 5,873,580 A | | 2/1999 | Swenson, Sr. et al. |
| 7,341,411 B2 | * | 3/2008 | Chen .................... B23B 31/006 279/103 |
| 2007/0210537 A1 | | 9/2007 | Weller et al. |
| 2007/0231094 A1 | | 10/2007 | Guy |
| 2010/0327541 A1 | | 12/2010 | Gerber |
| 2012/0193115 A1 | | 8/2012 | Hild et al. |
| 2013/0328275 A1 | | 12/2013 | Haimer |

FOREIGN PATENT DOCUMENTS

| | | | | |
|---|---|---|---|---|
| DE | 1270366 B | * | 6/1968 | ............ B23B 31/202 |
| DE | 4315612 A1 | | 11/1994 | |
| DE | 102004050967 A1 | | 4/2006 | |
| DE | 102006016804 A1 | | 10/2007 | |
| DE | 202007019453 U1 | | 9/2012 | |
| DE | 202012010701 U1 | | 7/2013 | |
| EP | 0481220 A2 | | 4/1992 | |
| EP | 1616647 B1 | | 9/2007 | |
| EP | 2266732 A1 | | 12/2013 | |

\* cited by examiner

Fig. 18

TOOL HOLDER

CROSS-REFERENCE TO RELATED APPLICATIONS

This application claims priority from European Patent Application No. EP 13 187 054.5 filed Oct. 2, 2013 and European Patent Application No. EP 14 154 112.8 filed Feb. 6, 2014, both of which are hereby incorporated by reference herein in their entireties.

FIELD

The invention relates to a tool holder having a collet that can be clamped to the shank of a tool, having a pull-out protection to secure the tool against being pulled out of the collet, whereby the pull-out protection comprises a protection element by means of which a pull-out force that acts on the tool is transmitted to the collet.

BACKGROUND

Figure 5:
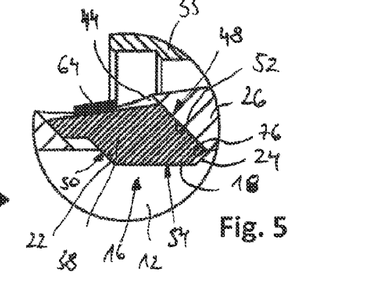
FIG. 5 a section in an enlarged view designated in FIG. 4c as V.

A tool holder for clamping the shank of a tool is known from European patent application EP 2 266 732 A1 (see FIG. 5). This tool holder has a clamping wedge provided with spiral ribs that engage with a helical groove of a collet. In order to clamp a tool shank, the clamping wedge and the tool that is to be clamped first have to be joined together and then, as a unit, screwed to the collet. Moreover, a certain amount of play between the ribs of the clamping wedge and the groove of the collet has to be compensated for by means of a screw bolt that acts in the axial direction. All in all, the clamping of a tool is relatively laborious and very time-consuming.

Furthermore, a drawback of European patent application EP 2 266 732 A1 is that the collet and the clamping wedge have to be provided with thread elements (ribs and grooves) that are relatively complex to manufacture, which is associated with a correspondingly high production effort.

An advantage of the tool holder known from European patent application EP 2 266 732 A1 is the possibility to use standardized tools, especially tools with a lateral drive flat that complies with DIN 1835-1, Form B. Such drive flats are also known by the name "Weldon surfaces" and, in the simplest case, they constitute part of an anti-twist protection of a tool in a Weldon chuck, whereby the Weldon surface of the tool serves as a counter-surface for the end face of a self-locking bolt that goes through the Weldon chuck.

SUMMARY

An embodiment of the present invention provides a tool holder including a collet configured to be clamped to the shank of a tool and a pull-out protection element configured to secure the tool against being pulled out of the collet. The pull-out protection further includes a protection element such that pull-out forces acting on the tool are transmitted to the collet. The protection element is mounted so as to be moveable relative to the collet and has a wedge-shaped configuration as well as force-transmission surface. When the protection element is in a radially inner engaged position with the tool, the protection element is configured to be clamped to the cool and the collet so as to be self locking.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION OF THE DRAWINGS

Before this backdrop, an embodiment of the present invention is based on the objective of creating a tool holder that is easy to manufacture and that permits a simple and quick clamping of a tool. Preferably, the tool holder should be suited for tools that have a lateral drive flat in the form of a Weldon surface.

In an embodiment, the protection element is mounted so as to be movable relative to the collet, and in that the protection element has a wedge-shaped configuration as well as force-transmission surfaces by means of which, when the protection element is in its engaged position with the tool, said protection element can be or is clamped to the tool and to the collet so as to be self-locking.

Within the scope of the present invention, the term "tool holder" refers to a unit that consists of at least the following components: the collet and the protection element. The tool holder according to an embodiment of the invention can additionally consist of other components, especially a collet holder for holding the collet and for establishing a connection to a tool machine and/or a clamping nut that can be screwed to the collet holder in order to clamp the collet.

The tool holder according to an embodiment of the invention permits simple assembly of a protection element that, when it is in its engaged position and thanks to its wedge shape, engages so as to be self-locking with the tool and with the collet. Here, it is advantageous that the clamping forces of the collet that act on the tool are not affected by the protection element and that the protection element only has to function as a blocking element once these clamping forces have been exceeded. In this manner, microcreeping or microshifting of the tool within the collet can be prevented.

The wedge-shaped configuration of the protection element makes it possible to achieve a self-locking effect. In particular, a pull-out force acting on the tool in the pull-out direction can be dissipated into the collet in such a way as to result in a force component that counteracts the pull-out force. The higher the pull-out force, the higher this force component as well.

Preferably, the protection element functions not only as a pull-out protection, but at the same time, as an anti-twist protection against twisting of the tool around a central tool axis within the collet due to twisting and/or torsional forces. Such a protection element can also be referred to as a pull-out protection element or anti-twist protection element.

The tool holder according to an embodiment of the invention makes it possible to retain the fundamental advantages that arise from using a collet (e.g. clamping a tool by means of several collet segments, extremely high concentric running precision, providing damping, a tool can be clamped independently of tolerances in the tool shank diameter), and also makes it possible to provide an easy-to-install tool holder that offers reliable protection against pulling out and/or twisting of the tool.

Preferably, the collet of the tool holder according to an embodiment of the invention has slots that extend parallel to a central axis of the collet, whereby said slots do not pass completely through the wall of the collet in the radial direction and they preferably extend over the entire length of the collet. In this manner, the pull-out protection according to an embodiment of the invention can be combined with very high concentric running precision and very high vibration damping.

In an especially preferred embodiment of the invention, it is provided that the protection element is movably mounted on the collet between a radially inner engaged position—which serves to engage the protection element in a lateral drive flat of the tool—and a radially outer assembly position—which serves to insert the shank into the collet. The mounting of the protection element on the collet makes it possible to provide a unit that can be very easily joined to a tool that is to be clamped. Here, the protection element can be moved between an engaged position or a ready-to-use position—in which the protection element interacts with a lateral drive flat of a tool—and an assembly position in which particularly a cylindrical shank of a tool can be inserted into the collet.

In order to simplify the structure of the tool holder, it is especially preferable for the protection element to be movable along a rectilinear axis of motion.

It is preferable for the axis of motion to be slanted toward the rear, for example, by an angle of 1° to 89°, preferably by an angle of 30° to 60°, especially by an angle of 45°, relative to an axis that is perpendicular to a central axis of the collet.

These orientations of the axis of motion promote "wedging" of the protection element with the collet.

For the easiest possible mounting of the protection element on the collet, it is preferable for the collet to have a material recess in which the protection element is movably accommodated. When the protection element is being shifted, it moves between the engaged position and the assembly position.

It is preferable for the material recess to have a guide surface to guide the protection element, so that there is no need for separate guide means, which, in principle, would also be a possibility.

It is particularly preferable for the material recess to have a front section that interacts with a front force-transmission surface of the protection element. This front section has a slant that preferably matches the slant of the front force-transmission surface and that, starting from an axis that is perpendicular to a central axis of the collet, amounts to, for example, an angle of 1° to 89°, preferably an angle of 30° to 60°, especially an angle of 45°.

It is also preferable for the material recess to be open towards an outer circumferential surface of the collet. This makes it possible to insert the protection element radially from the outside into the material recess of the collet, and especially to arrange a force-application means or sections of the force-application means in the area of the open circumferential surface.

In another embodiment of the invention, it is provided that the material recess has a delimiting surface that serves to define the engagement position and to limit the movement path of the protection element. Such a delimiting surface is especially advantageous if the radially inward-facing end face of the protection element is not supposed to come into contact with the radially outward-facing drive surface of the lateral drive flat of the tool, but rather if contact between the protection element and the drive flat of the tool is supposed to be made exclusively via force-transmission surfaces that act in the pull-out direction.

In an especially preferred embodiment, it is provided that the protection element interacts with a force-application means that generates a joining force that acts on the protection element in the direction of the engaged position in order to join the protection element to the drive flat. Such a force-application means permits the protection element to be autonomously moved from the assembly position into the engaged position. Nevertheless, the protection element can be moved very easily out of the engaged position into the engaged position, namely, in that an assembly force is applied whose magnitude is larger than the joining force that is exerted by the force-application means.

The force-application means has the further advantage that, when the protection element is in the engaged position, said force-application means acts on the protection element so as to pretension it. As a result, there is no need for the normally necessary and separately provided clamping means (for example, pressure screws) that act in the axial direction of the tool.

Another simplified assembly is achieved if the force-application means is arranged on the collet. In order to simplify the handling of the components of the tool holder, it is particularly preferable for the force-application means to be joined to the collet.

In an especially preferred embodiment, it is provided that the force-application means can be charged by moving the protection element out of the engaged position into the assembly position. This means that, when the protection element is being moved out of the engaged position into the assembly position, it acts against the force-application means, and energy, especially in the form of deformation energy, is stored in the force-application means. This energy can be used to provide the joining force that acts in the direction of the engaged position.

In order to simplify the structure of a force-application means, it is proposed for the joining force to be a compressive force.

Preferably, the force-application means is elastically deformable so that, when the protection element is moved from the engaged position into the assembly position, deformation energy can be stored in the force-application means.

The force-application means can be a spring element. It can be made, for instance, of metal, but it is preferably made of an elastomer. This makes it easier to provide a force-application means with a space-saving geometry.

It is preferable, for example, if the force-application means is configured to be ring-shaped, ring segment-shaped or in the form of a membrane, thus permitting a space-saving arrangement of the force-application means on the tool holder, especially on the collet of the tool holder.

Figures 1, 1A, 1B:
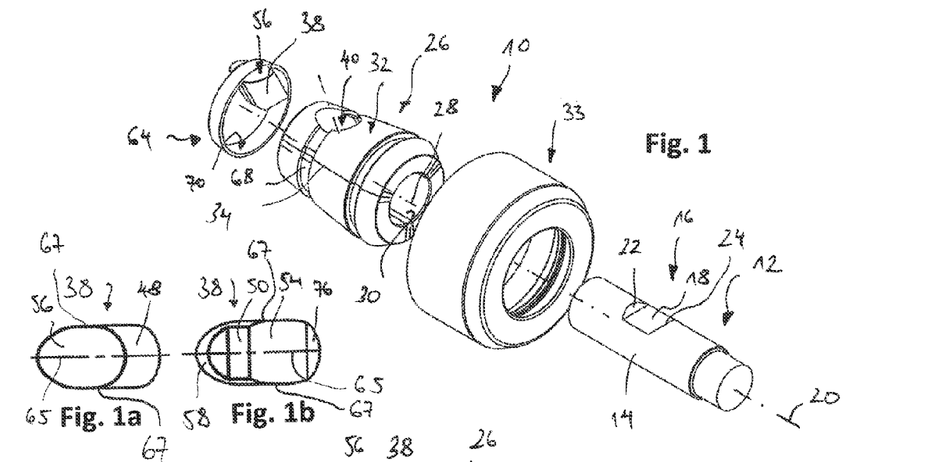
FIG. 1 a perspective exploded view of a first embodiment of a tool holder.
FIG. 1a a top view of the protection element of the tool holder according to FIG. 1.
FIG. 1b a bottom view of the protection element of the tool holder according to FIG. 1.

An embodiment of a tool holder is designated in its entirety with the reference numeral 10 in FIG. 1. The tool holder 10 serves to hold a tool 12, sections of which are shown in FIG. 1 and which particularly has a cylindrical shank 14. A lateral drive flat 16 is provided on the shank 14, especially in the form of a Weldon surface. The drive flat 16 comprises a radially outward-facing, preferably flat, base surface 18 that is oriented tangentially relative to a central axis 20 of the tool 12. The base surface 18 is adjacent to a rear wedge surface 22 and to a front wedge surface 24.

The tool holder 10 comprises a collet 26 that has a clamping surface 30 that is concentric relative to a central axis 28 of the collet 26, that particularly is cylindrical, and that serves to clamp the shank 14 of the tool 12.

The collet 26 has an outer circumferential surface 32 that, in particular, is conical.

The collet 26 is inserted into a collet holder which is generally known and thus not shown here, which has a holding surface that is complementary to the circumferential surface 32 of the collet 26 and that is clamped to the circumferential surface 32 of the collet 26, namely, by using a clamping nut 33 that is screwed to the collet holder in a generally known manner (see, for instance, European patent specification 1 616 647 B1).

The collet 26 has slots 34 that are distributed over the circumference around the central axis 28 and that run parallel to the central axis 28. The slots 34 permit a delimitation of collet body segments that are adjacent to each other and that can be deformed relative to each other in order to bring about a clamping of the shank 14 in the holding surface 30 of the collet 26.

Figures 2, 3:
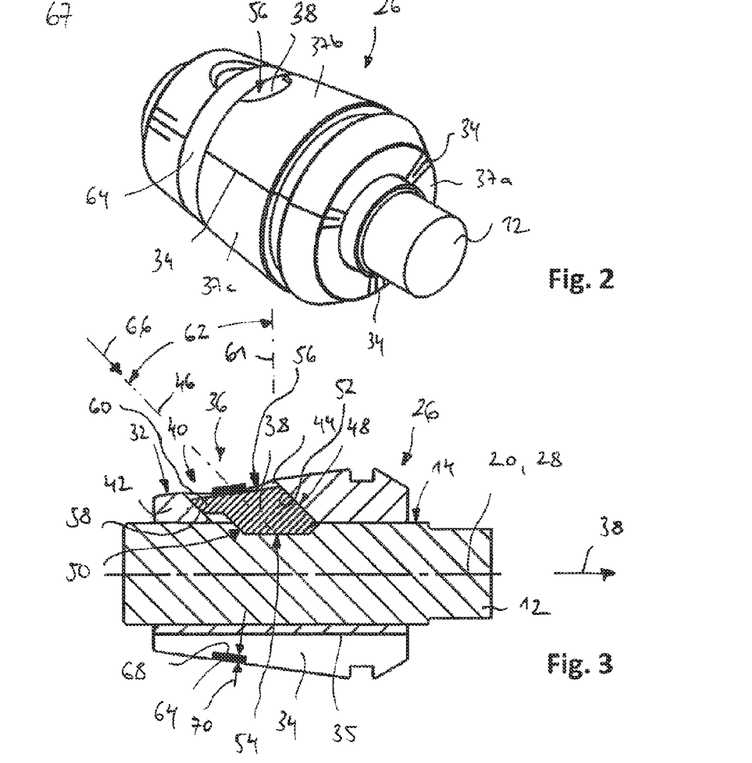
FIG. 2 a perspective view of the tool holder according to FIG. 1.
FIG. 3 a side view of the tool holder according to FIG. 1, in a longitudinal section.

Preferably, the slots 34 are dimensioned in such a way that they extend along the entire length (that is to say, parallel to the central collet axis 28) of the wall 42 of the collet 26, but they do not pass completely through the wall of the collet 26 in the radial direction, but rather, they extend only up to a limit stop 35 that acts in the radial direction (see FIG. 3). This forms collet segments 37a, 37b, 37c (see FIG. 2) that can be deformed relative to each other. Preferably, a maximum of three collet segments are provided, especially three collet segments.

The tool holder 10 comprises a pull-out protection 36 described below (see FIG. 3) that prevents a tool 12 that is held on the tool holder 10 from being pulled out of the collet 26 of the tool holder 10 in a pull-out direction 38.

The pull-out protection 36 comprises especially a wedge-shaped protection element 38 by means of which 26 a pull-out force that acts on the tool 12 is transmitted to the collet.

The protection element 38 is arranged in a material recess 40 of a wall 42 of the collet segment 37b. The material recess 40 has a guide surface 44 that is closed along the circumference so that the protection element 38 can be guided, preferably with a certain amount of play, along an axis of motion 46 inside the material recess 40. The axis of motion 46 is preferably rectilinear and is especially oriented in such a way that an imaginary extension of the axis of motion 46 intersects with the central axis 28 of the collet 26.

The axis of motion 46 is slanted towards the rear by an angle 62 relative to an axis 61 that is perpendicular to a central axis of the collet. An especially preferred angle 62 is 45°.

Furthermore, it is preferred for the axis of motion 46 to run in the radial direction relative to the central axis 28 of the collet 26 or, as shown in the drawing, to run in a direction that is slanted relative to a radial direction.

The protection element 38 has a front force-transmission surface 48 and a rear force-transmission surface 50. The surfaces 48 and 50 preferably run parallel to each other and especially parallel to the axis of motion 46. The rear force-transmission surface 50 interacts with the rear wedge surface 22 of the drive flat 16; the front force-transmission surface 48 interacts with a front section 52 of the guide surface 44 of the material recess 40.

It is preferable for the slant of the rear wedge surface 22 of the drive flat 16 to be identical to the slant of the rear force-transmission surface 50 of the protection element 38.

In a corresponding manner, it is preferable for the slant of the front section 52 of the material recess 40 to be identical to the slant of the front force-transmission surface 48 of the protection element 38.

Furthermore, it is preferable for the front section 52 of the material recess to have a slant that matches the slant of the rear wedge surface 22 of the drive flat 16. However, it is possible for the slant of the front section 52 to be greater than the slant of the wedge surface 22 relative to the axis 62.

The protection element 38 also comprises a radially inward-facing inner surface 54 that is oriented essentially parallel to the base surface 18 of the drive flat 16 of the tool 12 when the latter is in the assembled state in the collet 26. The protection element 38 also has a radially outward-facing outer surface 56 that runs, for example, essentially parallel to the circumferential surface 32 of the wall 42 of the collet 26.

It is preferable, but not absolutely necessary, for the distance between the rear force-transmission surface 50 and the front force-transmission surface 48 of the protection element 38 to be smaller than the distance between the front section 52 of the guide surface 44 and the rear section 58 of the guide surface 44. In order to compensate for such a difference in the distance, the protection element 38 can have a projection 60 that widens the outer surface 56 of the protection element 38 in comparison to the inner surface 54 of the protection element 38. The projection 60 has a covering function and prevents chips from getting into the material recess 40.

The protection element 38 extends along a wedge longitudinal axis 65 (see FIGS. 1a and 1b) that preferably runs parallel to the central collet axis 28 when the protection element 38 is arranged on the collet 26. The protection element 38 has side surfaces 67 that face away from each other, that run essentially parallel or tangentially to the wedge longitudinal axis 65, at least in sections, and that, together with corresponding contact surfaces of the material recess 40 of the collet 26, function as anti-twist protection against a twisting of the tool 12 around the tool axis 20. Here, the inner surface 54 or at least a delimiting edge of the inner surface 54 of the protection element 38 rests on the base surface 18 of the drive flat 16 of the tool 12.

The protection element 38 interacts with a force-application means 64 that provides a joining force 66 that presses the protection element 38 along the axis of motion 46 radially inwards (that is to say, in the direction of the central axis 28 of the collet holder 26).

The force-application means 64 is arranged on the collet 26, and it is especially held there so as to be captive.

For example, the force-application means 64 is ring-shaped and extends concentrically relative to the central axis 28 of the collet 26. In order to arrange the ring-shaped force-application means 64 on the collet 26, the wall 42 of the collet 26 has an annular groove 68 whose bed is offset radially inwards relative to the circumferential surface 32 of the collet 26.

Preferably, the depth 70 of the annular groove 68 is greater than the wall thickness of the force-application means 64, as measured in the same direction, so that the force-application means 64 does not protrude radially outwards beyond the circumferential surface 32 of the collet 26 when said force-application means 64 is arranged on the collet 26. Preferably, the force-application means 64 is made of an elastomer. When the force-application means 64 is in the relaxed state (see FIG. 1), the inner diameter of the annular element of the force-application means 64 is smaller than the diameter of the bed of the annular groove 68. As a result, when the annular element of the force-application means 64 is placed in the annular groove 68, the annular element is pretensioned and under tensile stress as seen in the circumferential direction.

A ring-shaped inner surface 70 of the annular element of the force-application means 64 interacts with the protection element 38 in the area of the outer surface 56 of the protection element 38 in order to exert the joining force 66 onto the protection element 38. Preferably, the inner surface 70 of the force-application means 64 is glued to the outer surface 56 of the protection element 38, so that the protection element 38 and the force-application means 64 form a unit that is easy to handle. In this manner, it can be avoided that the protection element 38 can become detached from the combination with the collet 26 when no tool 12 or no shank 14 of a tool 12 has been inserted into the collet 26.

The assembly of a tool 12 into the collet 26 with be described below making reference to FIGS. 4a to 5.

In order to assemble the tool holder 10, first of all, a unit is provided that consists of the collet 26, the protection element 38, and the force-application means 64. In this ready-to-use state, the protection element 38 is held onto the force-application means 64 by the latter and it assumes a radially inner position along the axis of motion 46 corresponding to an engaged position according to FIG. 4b.

Figure 4A:
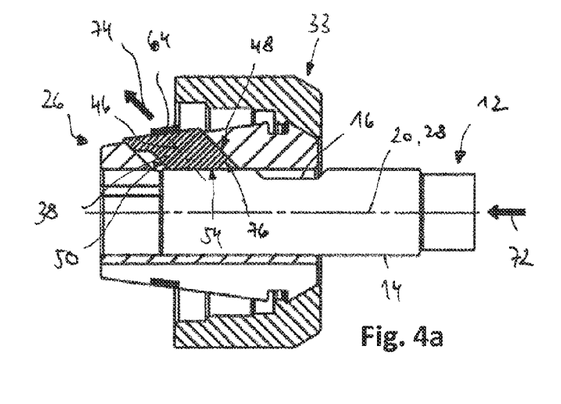
FIGS. 4a to 4c side views of consecutive assembly steps corresponding to FIG. 3, according to a first alternative.

Starting from this radially inner position, the insertion of the shank 14 of a tool 12 in an insertion direction 72 (see FIG. 4a) causes the outer surface of the shank 14 to move the protection element 38 radially outwards along the axis of motion 46 into the assembly position shown in FIG. 4a. During the insertion of the shank 14 of the tool 12 into the collet 26, a counter-force 74 is generated on the protection element 38 by means of pressure (for example, by hand) onto the tool 12 in the insertion direction 72, whereby the magnitude of this counter-force 74 is greater than the joining force 66 of the force-application means 64 that acts in the opposite direction.

In order to simplify the insertion of the shank 14 into the collet 26 and in order to simplify the movement of the protection element 38 out of a radially inner position into the assembly position shown in FIG. 4a, the protection element 38 can have a slanted surface 76 arranged between the inner surface 54 and the front force-transmission surface 48 of the protection element 38. Preferably, when the tool 12 is in the assembled state in the collet 26, the slanted surface 76 of the protection element 38 and the front wedge surface 24 of the drive flat 16 of the tool 12 are parallel to each other.

Starting from the state shown in FIG. 4a, pushing the shank 14 of the tool 12 further into the collet 26 causes the protection element 38 to lie flush with the drive flat 16 of the shank 14 along the axis of motion 46. The joining force 66 generated by the force-application means 64 then autonomously moves the protection element 38 out of the assembly position (FIG. 4a) into an engaged position (FIG. 4b), in which the protection element 38 is arranged so far radially inwards that the protection element 38 dips, at least in sections, into the drive flat 16 of the tool 12.

Figure 4B:
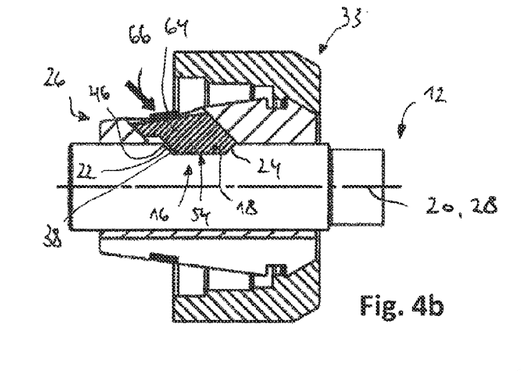
Figure 4C:
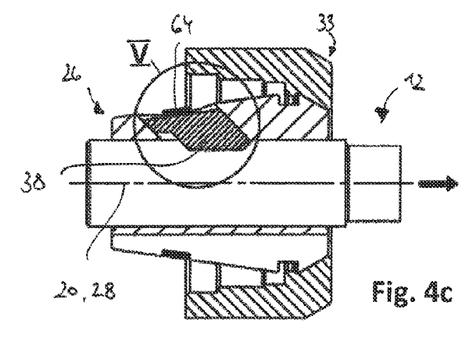

In the embodiment shown in FIGS. 4a to 5, the distance between the rear force-transmission surface 50 and the slanted surface 76 is slightly smaller than the distance between the wedge surfaces 22 and 24 of the drive flat 16. As a result, when the protection element 38 is in the engaged position, its inner surface 54 is in contact with the base surface 18 of the drive flat 16.

In order to compensate for a certain amount of play between the rear force-transmission surface 50 of the protection element 38 and the rear wedge surface 22 of the drive flat 16, the tool 12 is pulled forward (for example, by manually pulling on the tool 12—indicated by an arrow in FIG. 4c)—so that the rear force-transmission surface 50 comes into contact with the rear wedge surface 22 and the front force-transmission surface 48 is in contact with the front section 52 of the guide surface 44 (see FIG. 5). In this state, the slanted surface 76 of the protection element 38 is at a distance from the front wedge surface 24 of the drive flat 16; the inner surface of the protection element 38 is in contact with the base surface 18 of the drive flat 16.

Starting from the state shown in FIG. 4c, the final assembly of the tool holder 10 is completed in that the clamping nut 33 is screwed to a collet holder that is generally known and thus not shown here. Such a collet holder brings about a clamping of the collet 26 to the shank 14 of the tool 12. The collet holder also serves to make a connection to a tool machine that is likewise generally known and thus not shown here.

Figures 6A, 6B, 7:
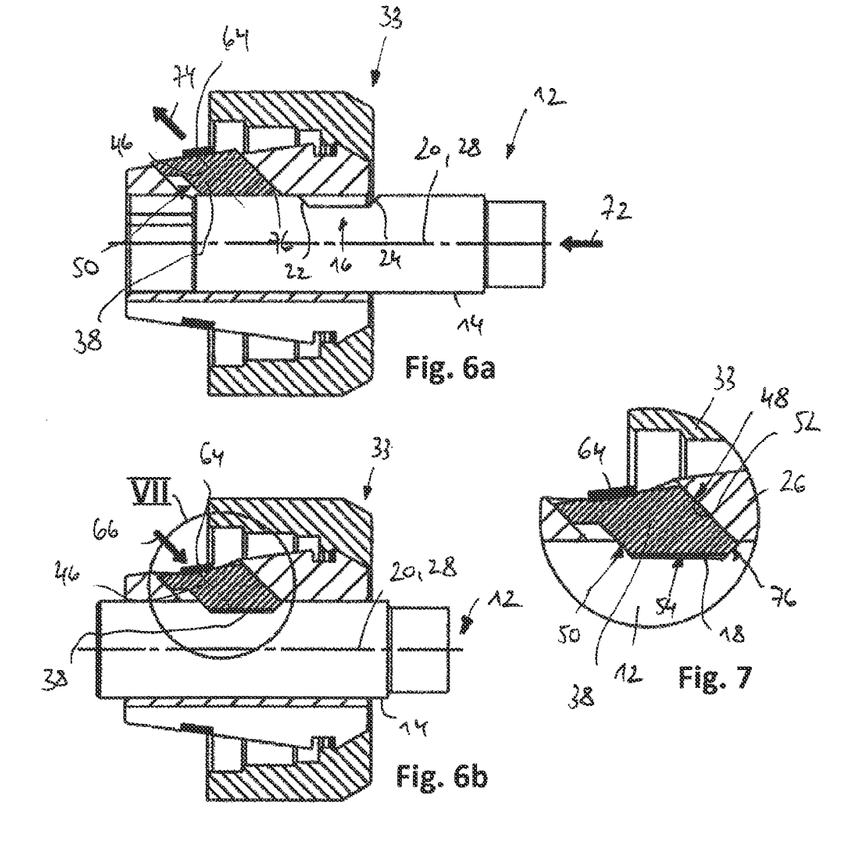
FIGS. 6a to 6b side views of consecutive assembly steps corresponding to FIG. 3, according to a second alternative.
FIG. 7 a section in an enlarged view designated in FIG. 6b as VII.
Figure 8:
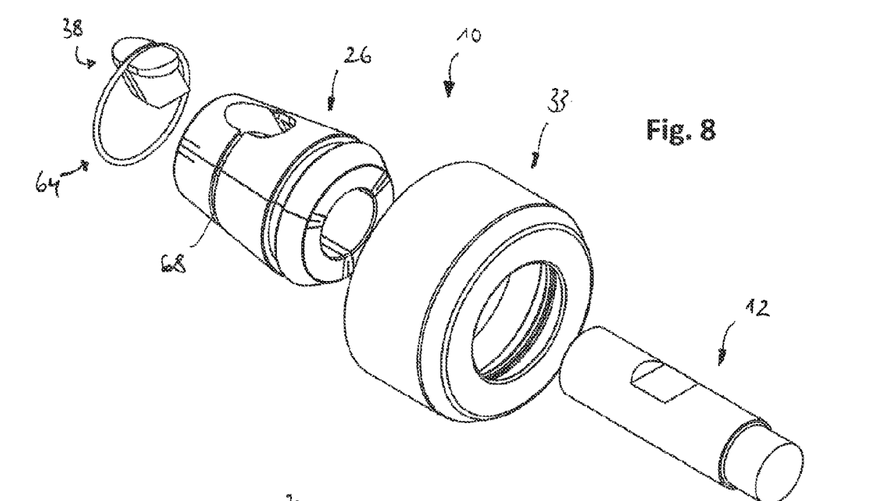
FIG. 8 a perspective exploded view of another embodiment of a tool holder.
Figure 9:
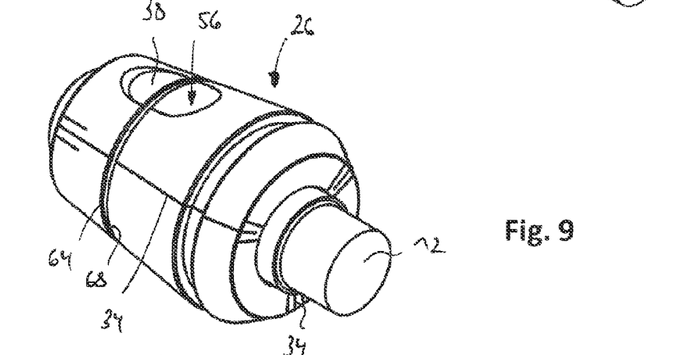
FIG. 9 a perspective view of the tool holder according to FIG. 8.
Figure 10:
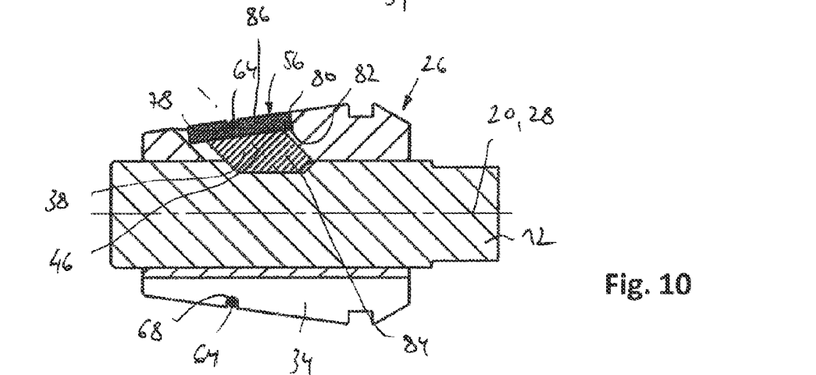
FIG. 10 a side view of the tool holder according to FIG. 8, in a longitudinal section.
Figure 11A:
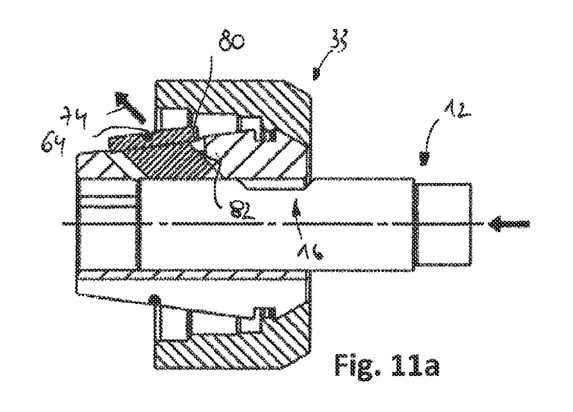
FIGS. 11a to 11c side views of consecutive assembly steps corresponding to FIG. 10.
Figure 11B:
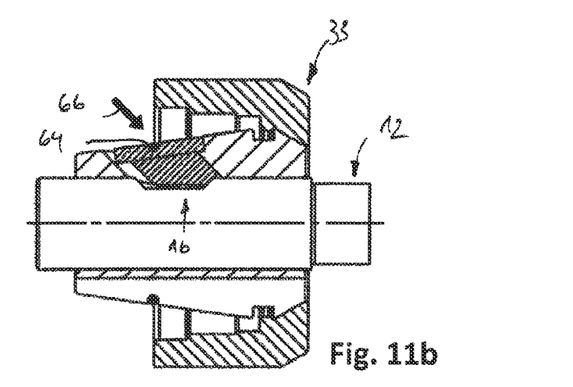
Figure 11C:
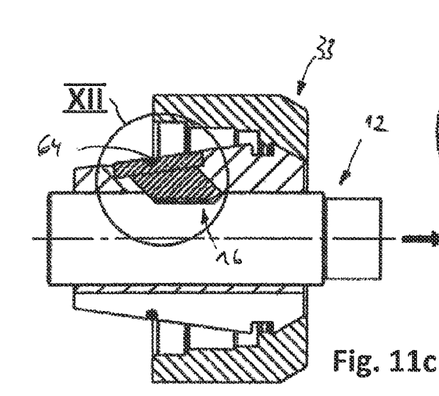
Figure 12:
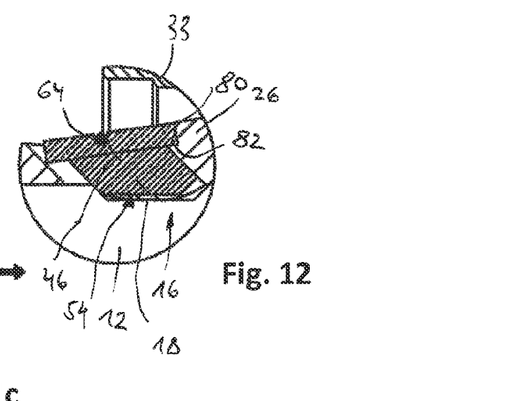
FIG. 12 a section in an enlarged view designated in FIG. 11c as XII.

A variant of the above-mentioned tool holder 10 will be described below making reference to FIGS. 6a to 7. In contrast to the above-mentioned embodiment of a tool holder 10, the distance between the rear force-transmission surface 50 and the slanted surface 76 is identical to the distance between the wedge surfaces 22 and 24 of the drive flat 16. As a result, starting from the assembly position shown in FIG. 6a, a movement of the protection element 38 into the engaged position shown in FIG. 6b is associated with the fact that, without any compensation for a certain amount of play, a contact of the rear force-transmission surface 50 of the protection element 38 is established with the rear wedge surface 22, and a contact of the slanted surface 76 of the protection element 38 is established with the front wedge surface 24 of the drive flat 16. When the protection element 38 is in the engaged position, the inner surface 54 of the protection element 38 is at a distance from the base surface 18 of the drive flat 16 (see FIG. 7).

The protection element 38 is preferably made of a hardened metal material, so that it can reliably transmit forces that act from the rear wedge surface 22 via the rear force-transmission surface 50 onto the front force-transmission surface 48, and from there onto the front section 52 of the guide surface 44, and that are introduced into the wall 42 of the collet 26.

Another embodiment of a tool holder 10 will be described below making reference to FIGS. 8 to 12. Only the differences from the embodiments of a tool holder 10 described above will be discussed below. For the rest, as far as the tool holder 10 according to FIGS. 8 to 12 is concerned, reference is made to the description above pertaining to the tool holders 10 according to FIGS. 1 to 7. Identical or functionally equivalent components have the same reference numerals.

A ring-shaped force-application means 64 is likewise provided with the tool holder 10 according to FIGS. 8 to 12. However, the cross section of the annular element is not rectangular but circular instead. This is, for example, an O-ring in the case of the force-application means 64 according to FIGS. 8 to 12. This O-ring interacts, for instance, with an annular groove 68 of the collet 26 whose profile is partially circular. In the area of the outer surface 56 of the protection element 38, the O-ring is accommodated in a holder 78 whose profile is partially circular. The holder 78 is offset radially inwards relative to the outer surface 56 of the protection element 38.

The protection element 38 has a shoulder 80 that interacts with a delimiting surface 82 of the collet 26 so that a movement path of the protection element 38 along the axis of motion 46 is limited in the direction of the central axis 28 of the collet 26.

It is possible for the protection element 38 to consist of one piece or, as shown in the drawing according to FIGS. 8 to 12, to be made up of two elements. Such a protection element has a wedge element 84 that functions as a pull-out protection as well as an additional element 86 that can be made of a softer material than the wedge element 84. For example, the additional element 86 is made of brass, that is to say, of a relatively soft metal. The use of a relatively soft metal for the additional element 86 has the advantage that an exposed outer surface 56 of the additional element 86 can serve as a support radially towards the outside against an especially conical holding surface of a collet holder made of a harder metal, namely, without the additional element 86 causing damage to the holding surface.

With the tool holder 10 according to FIGS. 8 to 12, the shoulder 80 of the protection element 38—by making contact with the delimiting surface 82 of the collet 26—serves to limit the movement path of the protection element 38 radially inwardly along the axis of motion 46. The delimiting surface 82, together with the shoulder 80, prevents the protection element 38 from being lost radially inwards, in case the force-application means 64 is not joined (for example, by gluing) to the protection element 38.

The mode of operation of the tool holder 10 according to FIGS. 8 to 12 is identical to the mode of operation of the tool holder 10 described above with reference to FIGS. 1 to 7. In particular, the play can also be compensated for as described above with reference to FIGS. 4a to 4c and FIG. 5, whereby however, due to the contact of the shoulder 80 with the delimiting surface 82, the inner surface 54 of the protection element 38 does not make contact with the base surface 18 of the drive flat 16 (see FIGS. 5 and 12).

Figures 13, 14:
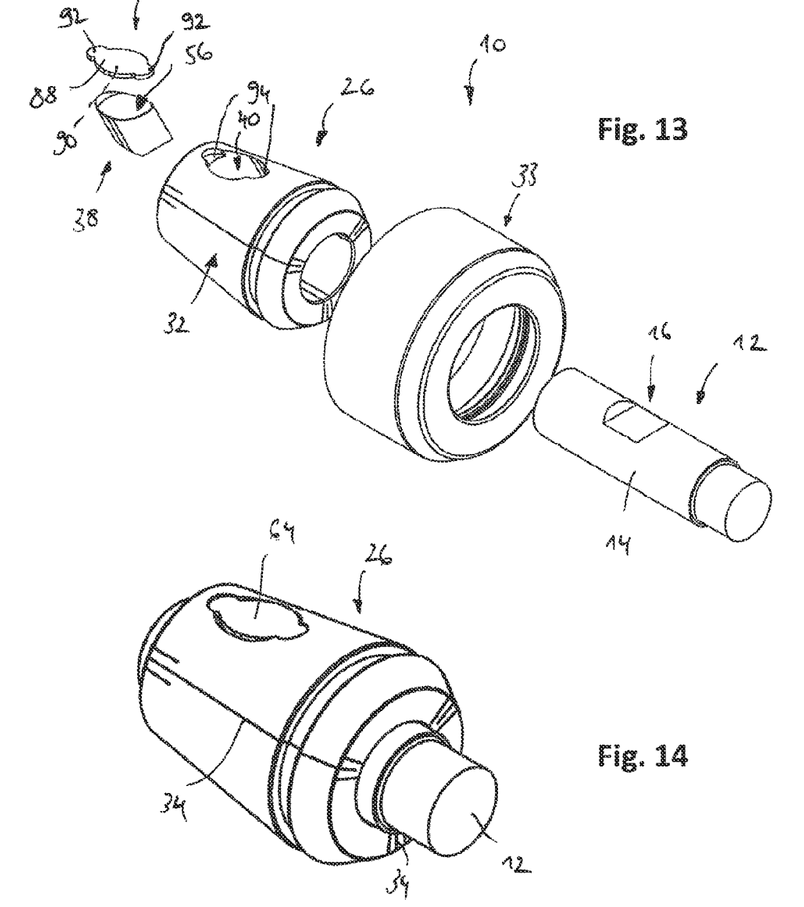
FIG. 13 a perspective exploded view of another embodiment of a tool holder.
FIG. 14 a perspective view of the tool holder according to FIG. 13.
Figure 15:
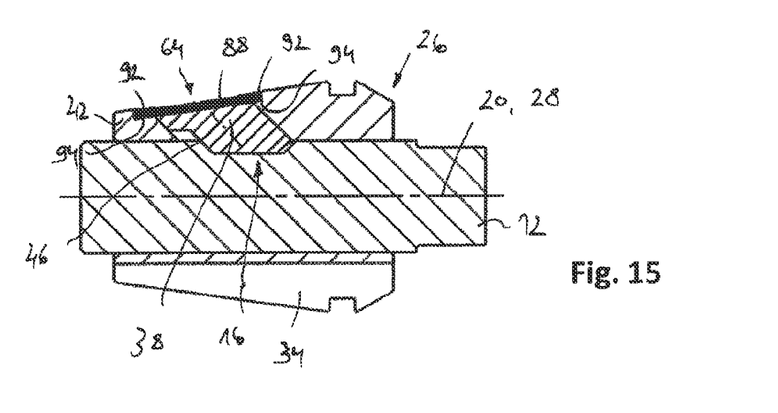
FIG. 15 a side view of the tool holder according to FIG. 13, in a longitudinal section.

Another embodiment of a tool holder 10 is shown in FIGS. 13 to 15. Except for the differences described below, the tool holder 10 according to FIGS. 13 to 15 is identical to the tool holders 10 described above, to whose description reference is hereby being made.

The tool holder 10 according to FIGS. 13 to 15 comprises a force-application means 64 that is not configured to be ring-shaped, but rather is provided in the form of a membrane element 88. A partial section of the underside 90 of the membrane element 88 is joined, especially glued, to the outer surface 56 of the protection element 38.

The membrane element 88 has at least one, preferably two or more, fastening sections 92 that extend beyond the outer surface 56 of the protection element 38 and that are arranged in complementary holders 94 of the collet 26, where they are joined to the wall 42 of the collet 26.

The membrane element 88 is made of an elastic material so that, starting from the engaged position of the protection element 38 that is shown in FIG. 15 and that has a drive flat 16 of the tool 12, a movement of the protection element 38 into the assembly position causes an elastic deformation of the membrane element 88, a process in which the membrane element 88 remains connected to the collet 26 in the area of the fastening sections 92, but it is bent radially outwards in a membrane section associated with the movement axis 46, as a result of which it stores deformation energy. This deformation energy is then available to move the protection element 38 out of the radially outer assembly position into the engaged position (see FIG. 15).

In the case of the tool holder 10 according to FIGS. 13 to 15, it is advantageous for the material recess 40 and the holders 94 to be produced by metalworking using the same tool and in the same set-up of a collet 26.

Figure 16:
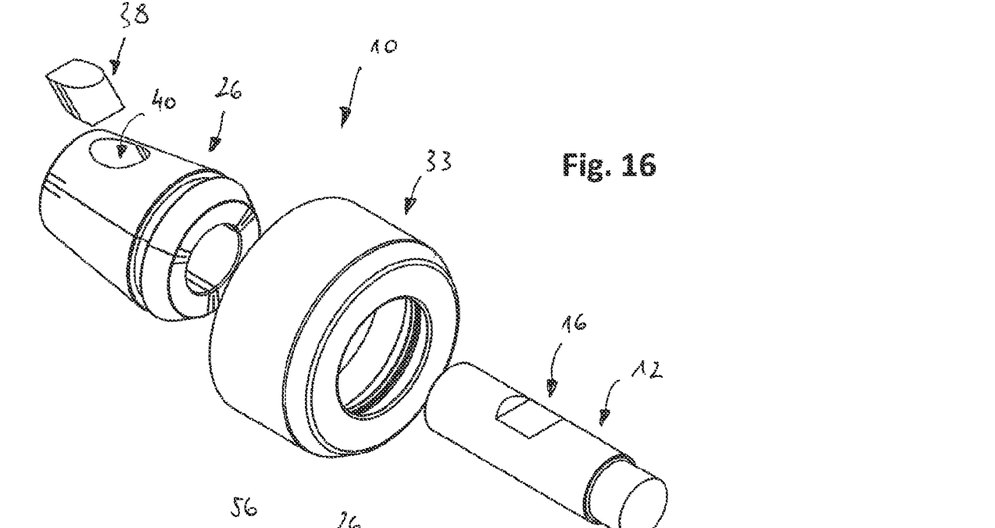
FIG. 16 a perspective exploded view of another embodiment of a tool holder.
Figures 17, 18:
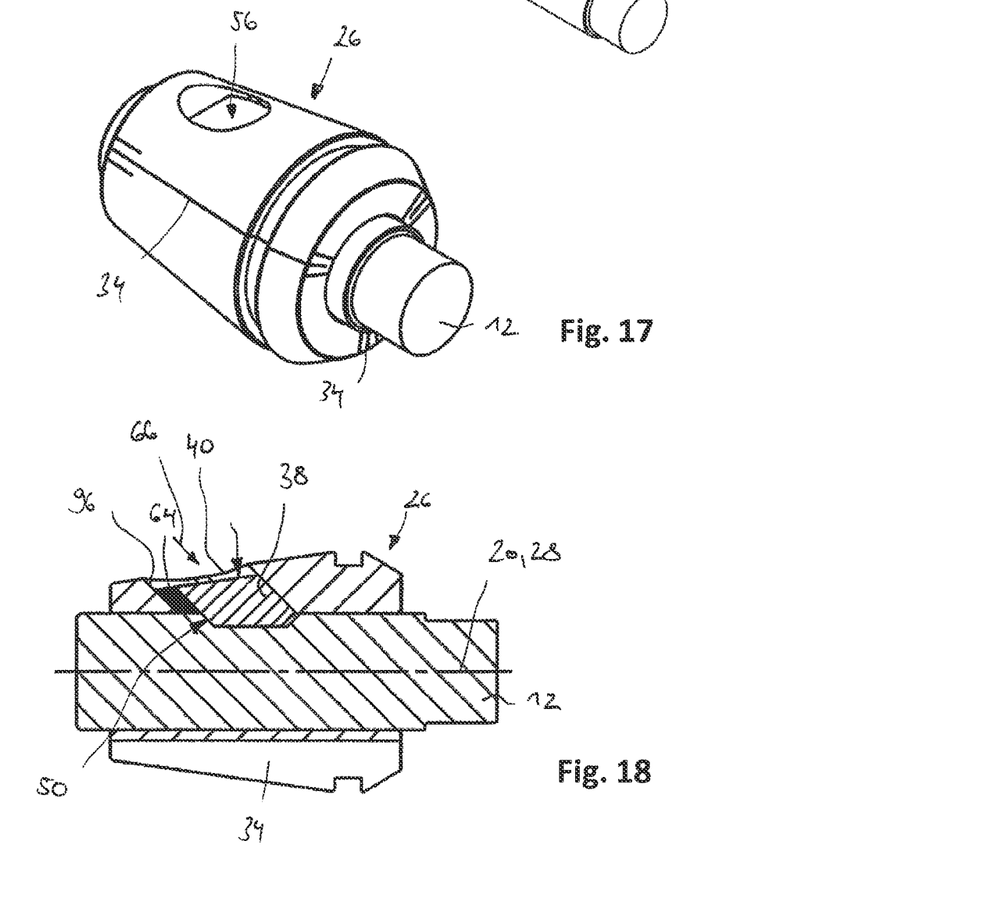
FIG. 17 a perspective view of the tool holder according to FIG. 16.
FIG. 18 a side view of the tool holder according to FIG. 16, in a longitudinal section.

FIGS. 16 to 18 show another embodiment of a tool holder 10 into which a force-application means 64 can be integrated with only a small amount of manufacturing effort. In contrast to the embodiment according to FIGS. 13 to 15, the material recess 40 of the collet 26 of the tool holder 10 according to FIGS. 16 to 18 is such that it has a material recess 40 that does not have any additional holders for fastening a force-application means 64. Instead, the force-application means 64 is arranged as a block-shaped element inside the material recess 40 and it is especially joined by adhesive force to the protection element 38 and to the wall of the material recess. Suitable surfaces for this purpose are especially the rear wall 96 of the material recess 40 and the surface of the protection element 38 that makes a transition to the rear force-transmission surface 50 or is adjacent to it.

The force-application means 64 is preferably made of an elastomer that is liquid during the production process and that is inserted into the material recess 40 of the collet 26, where it comes into contact with the wall 96 and with the protection element 38, where it then hardens. Here, the protection element 38 is preferably held in the engaged position (or positioned even further in the direction of the central axis 28 in order to increase the pretensioning), so that, after the elastomer hardens, a deflection of the protection element 38 in the assembly position results in an elastic deformation of the force-application means 64. Energy stored in this manner can then be released in order to exert a joining force 66 and to bring about a movement of the protection element 38 out of the assembly position into the engaged position.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A tool holder comprising:
   a collet configured to be clamped to the shank of a tool; and
   a pull-out protection configured to secure the tool against being pulled out of the collet, the pull-out protection including a wedge-shaped protection element having force-transmission surfaces configured such that pull-out forces acting on the tool are transmitted to the collet,
   wherein the protection element is mounted so as to be movable relative to the collet,
   wherein the protection element is, due to its wedge-shape, configured to be, when in a radially inner engaged position with the tool, clamped to the tool and to the collet so as to be self-locking,
   wherein clamping forces of the collet acting on the tool are not influenced by the protection element, and
   wherein the protection element only has a function as a blocking element when the pull-out forces acting on the tool exceed the clamping forces of the collet acting on the tool.

2. The tool holder recited in claim 1, wherein the protection element is movably mounted on the collet between the radially inner engaged position, which serves to engage the protection element in a lateral drive flat of the tool, and a radially outer assembly position, which serves to insert the shank into the collet.

3. The tool holder according to claim 1, wherein the protection element is movable along a rectilinear axis of motion.

4. The tool holder according to claim 3, wherein the axis of motion is slanted toward the rear by an angle of 1° to 89° relative to an axis that is perpendicular to a central axis of the collet.

5. The tool holder according to claim 4, wherein the axis of motion is slanted toward the rear by an angle of 30° to 60°.

6. The tool holder according to claim 5, wherein the axis of motion is slanted towards the rear by an angle of 45°.

7. The tool holder recited in claim 1, wherein the collet has a material recess in which the protection element is movably accommodated.

8. The tool holder recited in claim 7, wherein the material recess has a guide surface to guide the protection element.

9. The tool holder recited in claim 7, wherein the material recess has a front section that interacts with a front force-transmission surface of the protection element.

10. The tool holder recited in claim 7, wherein the material recess is open towards an outer circumferential surface of the collet.

11. The tool holder of claim 7, wherein the material recess has a delimiting surface that serves to define the radially inner engaged position and to limit the movement path of the protection element.

12. The tool holder recited in claim 1, wherein the protection element interacts with a spring element arranged on the collet, the spring element generating a joining force that acts on the protection element in the direction of the radially inner engaged position in order to join the protection element to the drive flat.

13. The tool holder recited in claim 12, wherein the spring element is joined to the collet.

14. The tool holder recited in claim 12, wherein the spring element can be charged by moving the protection element out of the radially inner engaged position into the radially outer assembly position.

15. The tool holder recited in claim 12, wherein the joining force is a compressive force.

16. The tool holder recited in claim 12, wherein the spring element is elastically deformable.

17. The tool holder recited in claim 16, wherein the spring element is made of an elastomer.

18. The tool holder recited in claim 12, wherein the spring element is configured to be ring-shaped, ring segment-shaped, or in the form of a membrane.

19. The tool holder recited in claim 18, wherein the spring element is glued to the protection element.

20. The tool holder recited in claim 12, wherein the spring element is joined to the protection element.

* * * * *